United States Patent
Karczewicz

(10) Patent No.: US 8,942,292 B2
(45) Date of Patent: Jan. 27, 2015

(54) EFFICIENT SIGNIFICANT COEFFICIENTS CODING IN SCALABLE VIDEO CODECS

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1755 days.

(21) Appl. No.: 11/868,179

(22) Filed: Oct. 5, 2007

(65) Prior Publication Data

US 2008/0089425 A1  Apr. 17, 2008

Related U.S. Application Data

(60) Provisional application No. 60/829,490, filed on Oct. 13, 2006.

(51) Int. Cl.
*H04N 7/50* (2006.01)
*H04N 19/33* (2014.01)
*H04N 19/34* (2014.01)
*H04N 19/40* (2014.01)

(52) U.S. Cl.
CPC ... *H04N 19/00436* (2013.01); *H04N 19/00442* (2013.01); *H04N 19/00472* (2013.01)
USPC .................................................. 375/240.23

(58) Field of Classification Search
USPC .................................................. 375/240.23
See application file for complete search history.

(56) References Cited

U.S. PATENT DOCUMENTS

| 6,792,044 | B2 | 9/2004 | Peng et al. |
| 6,894,628 | B2 * | 5/2005 | Marpe et al. ................... 341/107 |
| 6,909,753 | B2 | 6/2005 | Meehan et al. |
| 6,959,116 | B2 | 10/2005 | Sezer et al. |
| 7,136,532 | B2 | 11/2006 | Van Der Schaar |
| 7,227,894 | B2 | 6/2007 | Lin et al. |
| 7,286,710 | B2 * | 10/2007 | Marpe et al. ................... 382/239 |
| 7,519,229 | B2 * | 4/2009 | Wallace et al. ................ 382/232 |
| 8,345,752 | B2 * | 1/2013 | Lee et al. .................... 375/240.1 |
| 2005/0012648 | A1 * | 1/2005 | Marpe et al. ................... 341/107 |
| 2005/0030205 | A1 * | 2/2005 | Konoshima et al. ............ 341/50 |
| 2007/0223826 | A1 * | 9/2007 | Ridge et al. ................... 382/240 |

FOREIGN PATENT DOCUMENTS

WO  WO2008008714  1/2008

OTHER PUBLICATIONS

International Search Report and Written Opinion—PCT/US2007/081119, International Search Authority—European Patent Office—Nov. 4, 2009.

(Continued)

*Primary Examiner* — Benjamin Lamont
(74) *Attorney, Agent, or Firm* — Brent A. Boyd

(57) ABSTRACT

Techniques for efficient significant coefficients coding in scalable video codecs are described. In one configuration, a device including a processing circuit having a set of instruction operative to generate initialization tables for a current frame or slice is provided. The initialization tables have statistics of a significant coefficient pass for a previous encoded frame or slice using scalable video coding. The device also includes a transmitter to transmit the initialization tables with the current frame or slice to a decoder. The decoder can decode a frame or slice with the transmitted initialization tables. The decoder may also use resident default initialization tables.

21 Claims, 13 Drawing Sheets

(56) References Cited

OTHER PUBLICATIONS

Wang, Xianglin et al., "Inter-Layer Coefficient Coding for Scalable Video Coding," US Patent Application.

"Joint Draft 7: Scalable Video Coding [Jun. 9, 2008]" Joint Video Team (JVT) of ISO/IEC MPEG & ITU-T VCEG (ISO/IEC JTC1/SC29/WG11 and ITU-T SG16 06), No. JVT-T201, Sep. 26, 2006, 553 pp., e.g., pp. 512-518.

Bao Y., et al., "Adaptive Variable Length Coding for FGS", Joint Video Team (JVT) of ISO/IEC MPEG & ITU-T VCEG (ISO/IEC JTC1/SC29/WG11 and ITU-T SG16 Q.6) 20th Meeting: Klagenfurt, Austria, Jul. 15, 2006, JVT-T086r1.

* cited by examiner

Initialization Table[D] Luminance

| indexS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| EOBshiftInit[D] | 16 | 2 | 1 | 0 | 0 | 0 | 0 | 0 | 0 | 0 | 0 | 0 | 0 | 0 | 0 | 0 |
| sEOBshiftInit[D] | 16 | 6 | 6 | 6 | 6 | 6 | 6 | 6 | 6 | 6 | 6 | 5 | 4 | 3 | 2 | 1 |
| VLCtableSelectInit[D] | 1 | 1 | 1 | 0 | 0 | 0 | 0 | 0 | 0 | 0 | 0 | 0 | 0 | 0 | 0 | 0 |

FIG. 7
Prior Art

EFFICIENT SIGNIFICANT COEFFICIENTS CODING IN SCALABLE VIDEO CODECS

COPENDING APPLICATIONS

This invention claims priority benefit of provisional application Ser. No. 60/829,490, filed Oct. 13, 2006, incorporated herein by reference as if set forth in full below.

FIELD

The present disclosure relates generally to the field of codecs and, more specifically, to techniques for efficient significant coefficients coding in scalable video codecs.

BACKGROUND

Conventional video coding standards such as MPEG-1, H.261/263/264, etc. encode video either at a given quality setting, often referred to as "fixed QP encoding," or at a relatively constant bit rate via the use of a rate control mechanism. If, for some reason, the video needs to be transmitted or decoded at a different quality, then the data must first be decoded and then re-encoded using the appropriate setting. In some scenarios, e.g. in low-delay real-time applications, such "transcoding" may not be feasible. Similarly, conventional video coding standards encode video at a specific spatial resolution. If the video needs to be transmitted or decoded at a lower resolution, then the data must first be decoded, spatially scaled, and then re-encoded. Again, such transcoding is not feasible in some scenarios.

There is therefore a need for techniques for efficient significant coefficients coding in scalable video codecs.

SUMMARY

Techniques for efficient significant coefficients coding in scalable video codecs are provided. In one configuration, a device comprising a processing circuit having a set of instruction operative to generate initialization tables for a current frame or slice, the initialization table having statistics of a significant coefficient pass for a previous encoded frame or slice using scalable video coding is provided. The device also includes a transmitter to transmit the initialization tables with the current frame or slice to a decoder.

In another configuration, a computer program product including a computer readable medium having instructions for causing a computer to: generate initialization tables for a current frame or slice, the initialization table having statistics of a significant coefficient pass for a previous encoded frame or slice using scalable video coding is provided. The computer program product also includes instructions to cause a computer to transmit the initialization tables with the current frame or slice to a decoder.

In a still further configuration, a method comprising encoding a current frame or slice using scalable video coding is provided. The method also includes generating initialization tables for the current frame or slice, the initialization table having statistics of a significant coefficient pass for a previous encoded frame or slice using the scalable video coding. The method further includes transmitting the initialization tables with the current frame or slice to a decoder; and decoding by the decoder the current frame or slice using the transmitted initialization tables.

Additional aspects will become more readily apparent from the detailed description, particularly when taken together with the appended drawings.

BRIEF DESCRIPTION OF THE DRAWINGS

Aspects and configurations of the disclosure will become more apparent from the detailed description set forth below when taken in conjunction with the drawings in which like reference characters identify corresponding elements throughout.

FIGS. 3A, 3B and 3C show example blocks where all coefficients are classified as significant pass coefficients.

FIGS. 4A, 4B and 4C show an example of the coefficients of the significant pass and refinement pass.

FIG. 7 shows an example of a conventional default initialization table for SVC.

Figure 1:
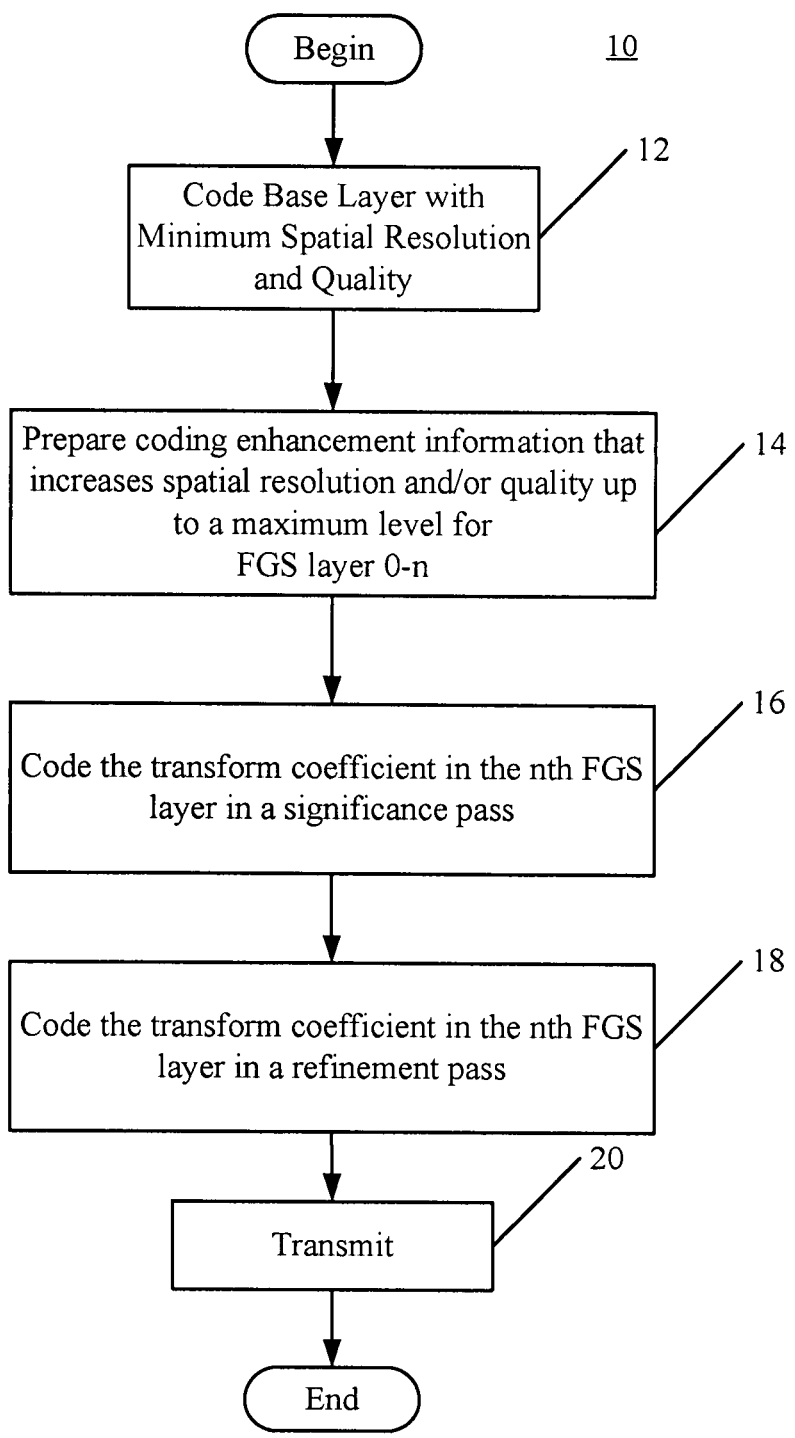
FIG. 1 shows a general flowchart for conventional scalable video coding (SVC) using Fine Granularity Scalability (FGS).

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

Figure 2:
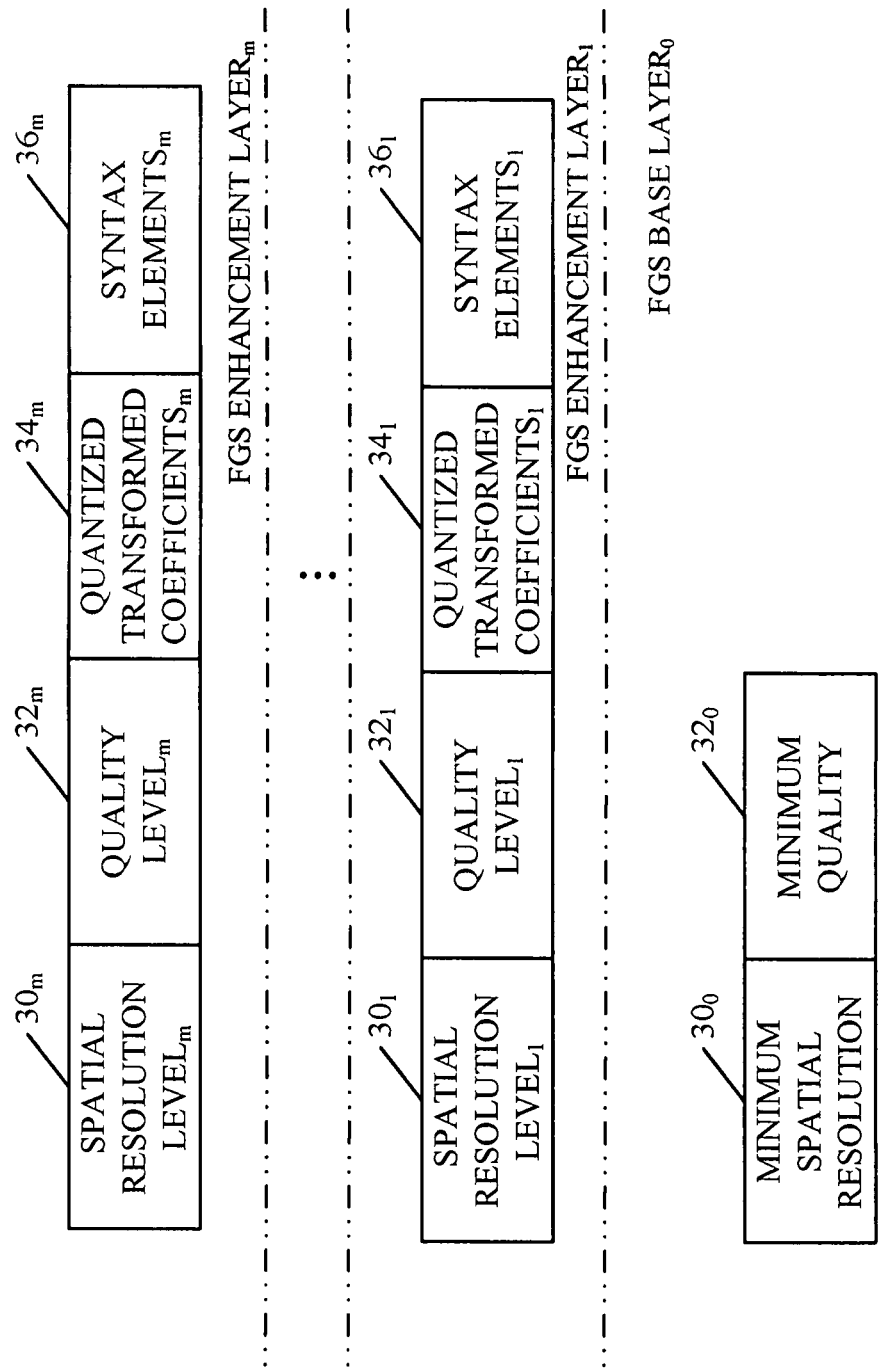
FIG. 2 shows a conventional SVC code with FGS.

FIG. 1 shows a general flowchart of conventional scalable video coding (SVC) 10 using Fine Granularity Scalability (FGS). Scalable video coding (SVC) 10 overcomes transcoding issues. The process for SVC 10 will be described in combination with FIG. 2. FIG. 2 shows a conventional SVC code with FGS. The general process for SVC 10 begins with block 12 by coding a "base layer" (FIG. 2) with a minimum spatial resolution $30_0$ and quality $32_0$ where 0 denotes the base layer. Block 12 is followed by block 14 where coding enhancement information is prepared that increases spatial resolution $30_1$-$30_m$ and/or quality $32_1$-$32_m$ up to a maximum level. Therefore, a reduction in spatial resolution may be achieved by simply discarding the spatial enhancement information, without the need to transcode.

For quality enhancement, the information may often be truncated at discrete (but closely-spaced) points, affording additional flexibility by permitting intermediate qualities between the "base" and "maximum" to be achieved. The FGS enhancement layers 1-$m$ allowing to achieve quality scalability are often termed as FGS (Fine Granularity Scalability). Each of the FGS layers 0-$m$ contains quantized transformed coefficients $34_0$-$34_m$ and possibly other syntax elements $36_1$-$36_m$ such as, without limitation, motion vectors.

Coding of the transform coefficient in the m-th FGS enhancement layer usually take place in two passes—refinement, at block 18, and significance pass, at block 16. In the significance pass at block 16, all the coefficients with reconstructed values equal to zero in all the lower FGS layers are coded. Remaining coefficients are coded in the refinement pass at block 18. Then, the FGS enhancement layer information may be transmitted at block 20.

FIGS. 3A, 3B and 3C show example blocks where all coefficients are classified as significant pass coefficients. The zigzag pattern shown in FIG. 3A is used for all 4×4 blocks 40A, 40B and 40C. The exemplary blocks 40A, 40B and 40C of FIGS. 3A, 3B and 3C, respectively represents a case where coefficients are classified as significance pass coefficients. Within each 4×4 block 40A, 40B and 40C in FIGS. 3A, 3B and 3C, coefficients are broken into run-value pairs. In the block 40A of FIG. 3A, the coefficients would be divided into {1}, {0-1}, {1}, {0-0-1}. In the block 40B of FIG. 3B, the coefficients would be divided into {0-1}, {1}, {0-1}. In the block 40C of FIG. 3C, the coefficients would be {000000001}.

A significance run is fully described by its starting scan index, number of coefficients equal to 0, and terminating value, or (p,r,v) triplet. Thus the runs in the block 40A of FIG. 3A would be $(0,0,1)_0$, $(1,1,1)_0$, $(3,0,1)_0$ and $(4,2,1)_0$; and for the block 40B of FIG. 3B would be $(0,1,1)_1$, $(2,0,1)_1$, and $(3,1,1)_1$. The subscript indicates the block index and is added for clarity. In the ith coding "cycle", all runs where p≤i are coded from all blocks. In this example, the runs coded in each cycle would be:

Cycle 0: $(0,0,1)_0$, $(0,1,1)_1$, $(0,8,1)_2$
Cycle 1: $(1,1,1)_0$
Cycle 2: $(2,0,1)_1$
Cycle 3: $(3,0,1)_0$, $(3,1,1)_1$; and
Cycle 4: $(4,2,1)_0$.

FIGS. 4A, 4B and 4C show an example of the coefficients of the significant pass and refinement pass. The zigzag pattern shown in FIG. 4A is used for all 4×4 blocks 50A, 50B and 50C. The shaded coefficients in the blocks 50A, 50B and 50C belong to the refinement pass. The refinement pass coefficients are skipped when computing run lengths. Hence, in this example, the significance runs in the first block 50A would be (0,1,1)O, (1,2,1)O and (5,2,1)O. The significance runs for the second block 50B would be (0,2,1)1 and (2,1,1)1. The significance runs for the third block 50C would be (0,6,1)2. Using the special run-length 'X' to indicate a refinement coefficient at the specified scan index, the coefficients coded in each cycle would be:

Cycle 0: (0,0,1)0, (0,1,1)1, (0,5,1)2
Cycle 1: (1,1,1)o
Cycle 2: (2,0,1)1, (2,X,0)2
Cycle 3: (3,X,1)o, EOB1, (3,X,0)2
Cycle 4: (4,X,0)0, (4,X,1)1, (4,X,0)2; and
Cycle 5: (5,1,1)0

The symbol '$EOB_n$' means that no more non-zero significance pass coefficients remain to be coded in block n where n is a counter for a block. In addition to an end-of-block (EOB), a special EOB (sEOB) can be sent. It means that no more non-zero significance pass coefficients remain to be coded in block n, but some of the significant coefficient levels absolute value are larger than 1. For those blocks, additional information will be transmitted.

The probability of EOB and sEOB symbols occurring varies between frames and from one sequence to another depending upon frame content. When describing run lengths by a (p, r, v) triplet, the value of r is equal to the number of coefficients coded to equal 0. For example, the run {0, 0, 0, 1} would be assigned the triplet (0, 3, 1). The values of r=C and r=D are reserved to allow for the EOB and sEOB symbols.

The coding efficiency can be considerably improved if a variable length coded (VLC) table used to encode the significance run and values C and D reserved for EOB and sEOB symbol depend on the cycle number or the starting scan position.

Figure 5:
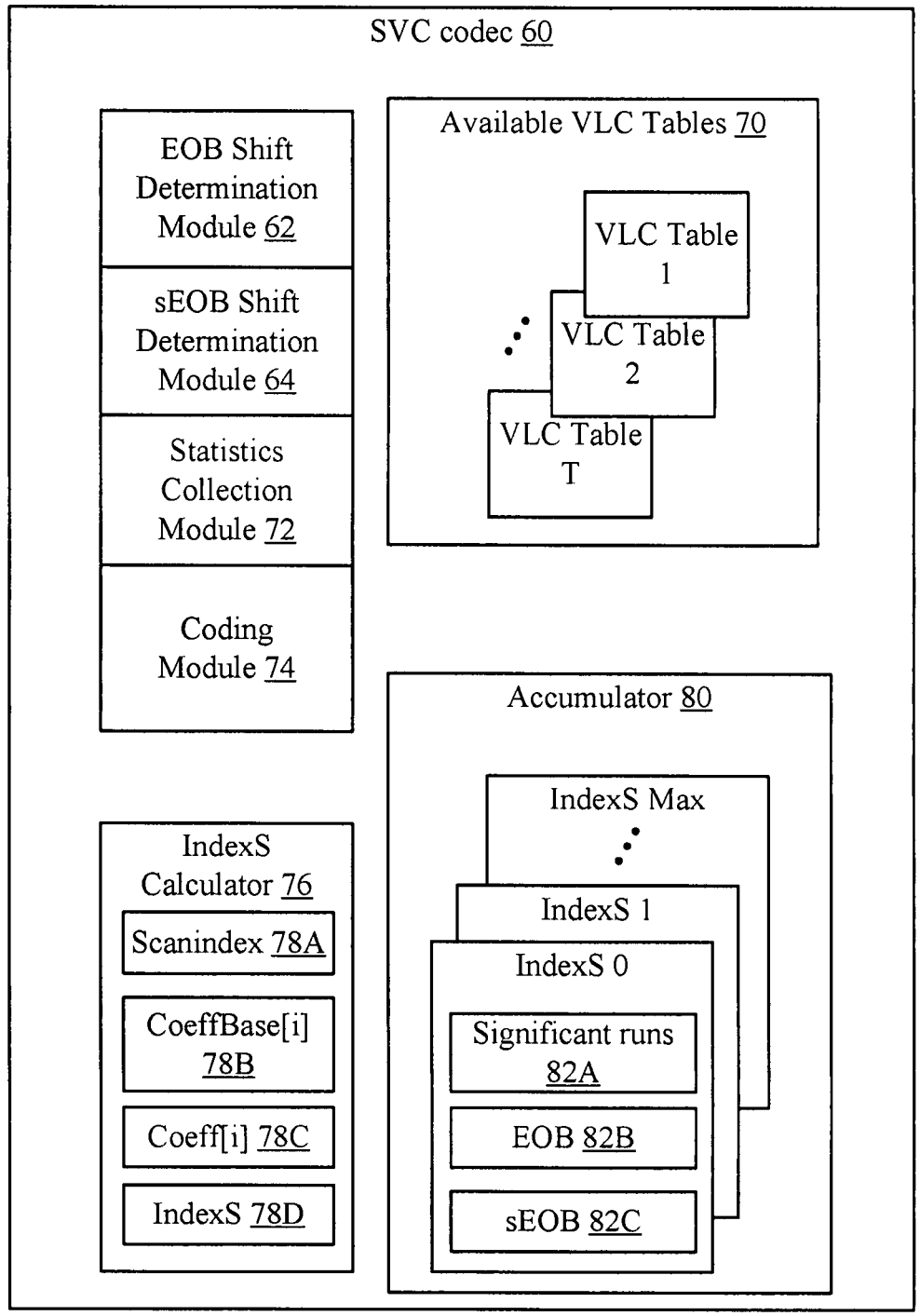
FIG. 5 shows a conventional SVC codec.

FIG. 5 shows a conventional SVC codec 60. One solution considered for a Scalable Video Coding (SVC) coder 60 includes dynamically determining the end-of-block (EOB) with an EOB determination module 62 and sEOB shifts a sEOB shifts determination module 64 and which VLC table 1, 2, . . . , T, out of a set of available VLC tables 70, should be used to code significant runs based on the statistics collected via a statistics collection module 72 while coding is being performed by coding module 74. The VLC table 1, 2, . . . , T, EOB and sEOB shifts depend on indexS where indexS is calculated, according to an exemplary pseudo code (1), as follows:
indexS=0;

$$\text{for } (i=0; i<\text{scanIndex}; i++)\{\text{if}(!\text{coeffBase}[i]\&\&\text{coeff}[i])\{\text{indexS}=i+1;\}\} \quad (1)$$

where i is a counter to identify a position in a zigzag scan of a significant coefficient pass; scanIndex is the starting scan position index for a cycle during the significant coefficient pass; coeffbase[i] is a value of the transform coefficient reconstructed using information for the FGS layers from 0 to n−1 at scan position i; coeff [i] level of the coefficient for currently coded n-th FGS layer; "!" means a bit flip; and && represents a logical AND function. It should be noted that many of the equations and expressions set forth herein use syntax similar to C or C++ computer programming language. The expressions are for illustrative purposes and can be expressed in other computer programming languages with different syntax.

The SVC coder 60 further includes an indexS calculator 76 which tracks the scanIndex 78A, the coeffBase[i] 78B, the coeff [i] 78C, and indexS 78D. In both the encoder and decoder, and accumulator 80 is provided to store the accumulated counts of symbols (significance runs 82A, EOB 82B, sEOB 82C) separately for different values of indexS 0, 1, . . . Max where Max is a function of the total number of scan positions in the zigzag pattern used.

Figure 6:
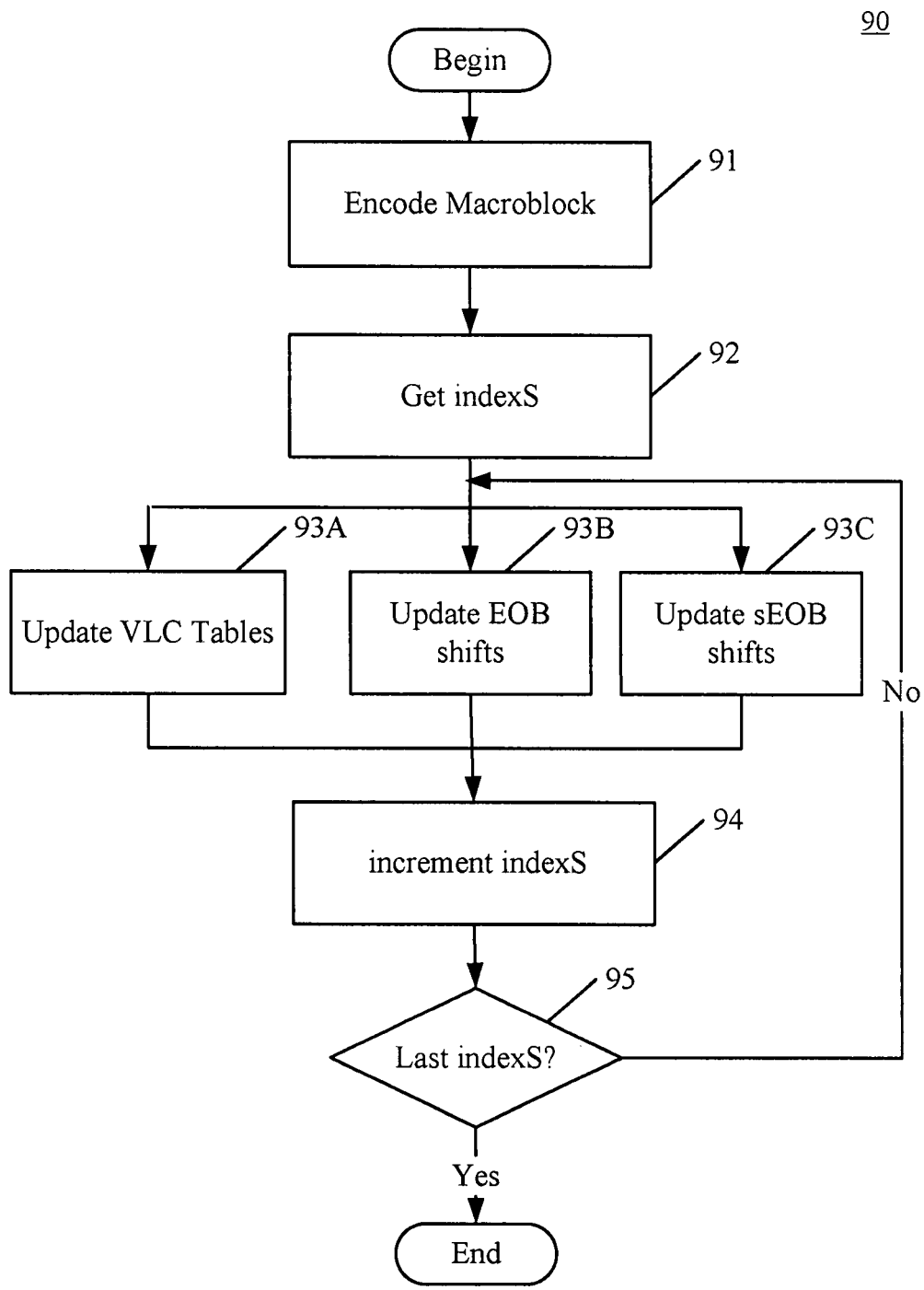
FIG. 6 shows a general flowchart of a conventional SVC encoding process for encoding a macroblock using SVC.

FIG. 6 shows a general flowchart for a conventional SVC encoding process 90 for encoding a macroblock using the SVC. The process begins at block 91 with encoding a macroblock. After each macroblock is encoded at block 91, the VLC tables, EOB and sEOB shifts are updated at blocks 93A, 93B and 93C, respectively, for each value of indexS. Hence, block 91 is followed by block 92 where the indexS is obtained. Block 92 is followed by blocks 93A, 93B and 93C where the VLC tables, EOB and sEOB shifts are updated. The blocks 93A, 93B and 93C are shown in parallel. However, the illustration is for illustrative purposes. Thus, flowchart blocks may be performed in the depicted order or these blocks or portions thereof may be performed contemporaneously, in parallel, or in a different order. In some instances, the blocks may be omitted if the updating is not required for any one loop iteration.

Blocks 93A, 93B and 93C are followed by block 94 where the indexS is incremented. Block 94 is followed by block 95 whether a determination is made whether all the VLC tables, EOB and sEOB shifts have been updated for the last value of indexS. If the determination is "No," the process 90 loops back to repeat the loop of 93A, 93B, 93C, 94 and 95 until the last indexS. If the determination at block 95 is "Yes," the process 90 ends.

One of the disadvantages with the above solution is complexity of the adaptation. For example when encoding/decoding Cycle X, the indexS can take any value from 0 to Max. Hence at the end of each macroblock EOB, sEOB shifts and VLC table have to be found for indexS=0, 1, . . . , Max.

At low bit-rates and/or in connection with slice coding (e.g. Quarter Common Intermediate Format QCIF slices), the bit-rate, which is needed to adapt to the symbol statistics, can represent a substantial amount of the frame/slice bit-rate. Thus, the rate-distortion performance can drop if unsuitable VLC table or EOB/sEOB shift initializations are used for small slices and/or low bit-rates.

FIG. 7 shows an example of a conventional default initialization table 99 for SVC. The default initialization table 99 is created using a conventional VLC table index and EOB shift initialization method for SVC. The conventional VLC table index and EOB shift initialization method considered for SVC supports only a single set of default initializations tables EOBshiftInit[D], sEOBshiftInit[D] and VLCtableSelectInit [D], where D denotes default. As can be readily seen, the values of the EOBshiftInit[D] indicate that for indexS=0 EOB shift should be equal to 16 (in the current SVC syntax EOB should be never signaled for indexS=0 hence the maximum value of EOB Shift is used). For indexS=1 EOB shift should be equal to 2, etc. Values of the VLCtableSelectInit[D] indicate that for indexS=0, 1 and 2, VLC table 1 should be used and for indexS 3-15 VLC table 0 is used. The values of the sEOBshiftInit[D] indicate that for indexS=0 sEOB shift should be equal to 16 and 6 for indexS=1-10 and monotonically decreases thereafter. The default tables are available at the decoder side of the SVC codec 60.

The initialization tables in FIG. 7 are used for luminance and another set of initialization tables (not shown) is used for chrominance. However, using a single set of initialization tables is not sufficient since encoding of video material with widely varying content results in substantial varying symbol statistics (and thus, in substantial varying VLC tables, EOB and sEOB shifts selected for each value of indexS).

Figure 8:
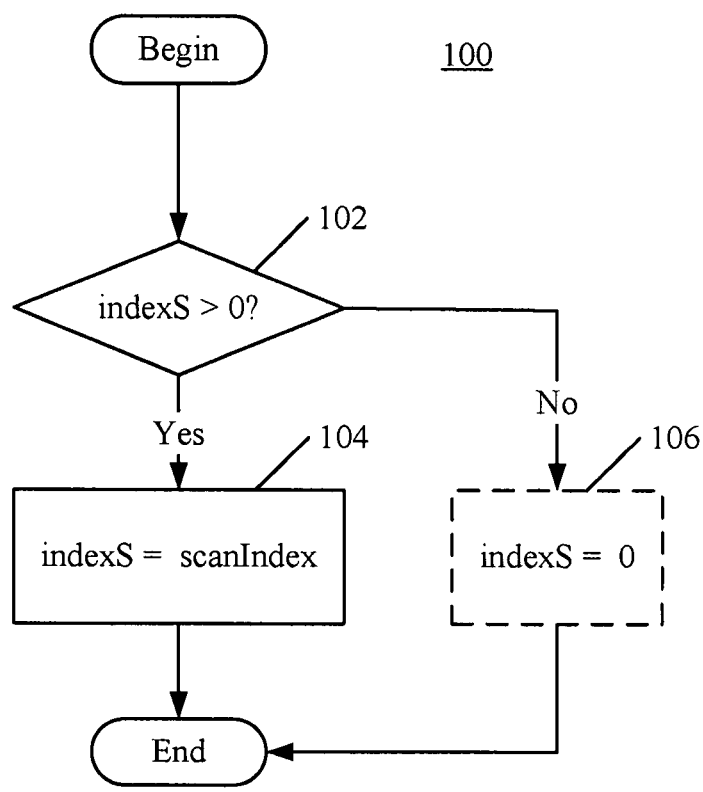
FIG. 8 shows a general flowchart of an indexS redefining process.

FIG. 8 shows a general flowchart of an indexS redefining process 100. To reduce the complexity of table adaptation indexS is redefined, according to exemplary pseudo code (2), as follows:

$$\text{if } (indexS>0)\{indexS=scanIndex;\} \qquad (2)$$

where scanIndex is the starting scan position index for a cycle.

In general, the indexS redefining process 100 begins at block 102 where a determination is made whether the indexS is greater than 0. If the determination is "Yes," then block 102 is followed by block 104 where indexS equals scanIndex. However, if the determination is "No," then block 102 is followed by block 106 where indexS is equal to 0. Block 106 is shown as a dotted line to indicate an optional step. It is implied from the psuedocode that indexS can be 0 or scanIndex. Blocks 104 and 106 end the process 100.

Thus, indexS is redefined to equal only the starting scan index, denoted as scanIndex, or 0. That means that for every cycle the VLC table index, EOB and sEOB shifts for only two values of indexS are calculated.

Figure 9:
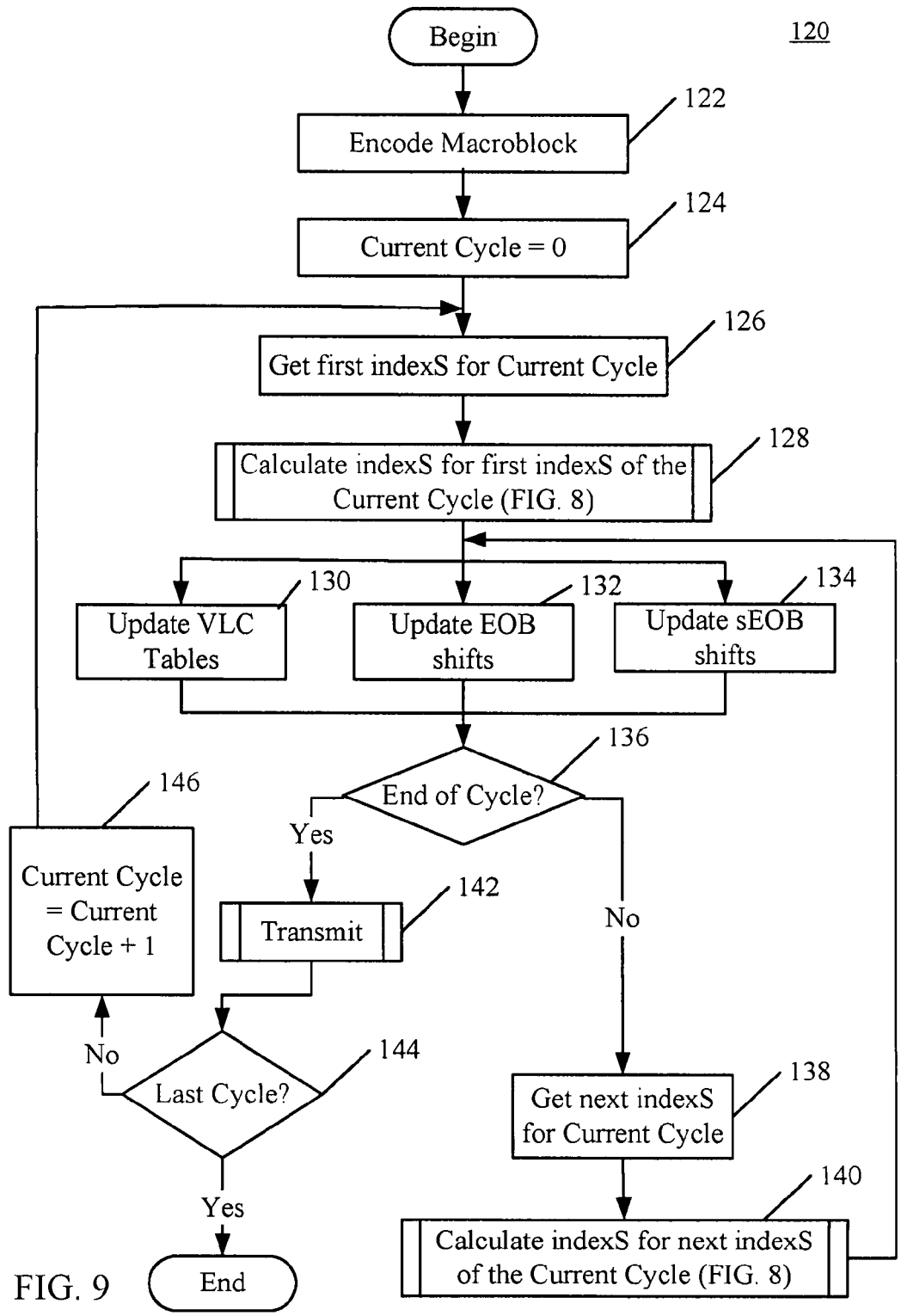
FIG. 9 shows a general flowchart of a SVC encoding process for encoding a macroblock using SVC and the redefined indexS.

FIG. 9 shows a general flowchart of a SVC encoding process 120 for encoding a macroblock using SVC and the redefined indexS. The SVC encoding process 120 begins at block 122 with encoding a macroblock. After each macroblock is encoded at block 122, current cycle is set to equal 0 at block 124. Block 124 is followed by block 126 where the first indexS for a current cycle is obtained. It may be 0, the starting scan index or some other number in the cycle calculated according to code (1) above. Block 126 is followed by block 128 where the indexS is redefined in accordance with the process 100 of FIG. 8. Block 128 is followed by block 130, 132 and 134 where the VLC tables, EOB and sEOB shifts are updated, the current value of indexS. Blocks 130, 132 and 134 are shown in parallel but may be formed in different order and/or skipped as necessary. Blocks 130, 132 and 134 are followed by block 136 where a determination is made whether it is the end of the cycle. If the determination is "No," then the next indexS is obtained at block 138. Block 138 is followed by block 140 where the indexS is calculated for the current cycle in accordance with the process 100 of FIG. 8. Block 140 loops back to before blocks 130, 132 and 134 so that the VLC tables, EOB and sEOB shifts are updated again for the current value of indexS.

Returning again to block 136, the end of cycle may be determined based on several conditions. Nonetheless, the end of cycle may be determined so that the indexS will only take two values 0 or scanIndex. Thus, after the two loop iterations are complete for indexS=0 and scanIndex, the current cycle is updated and may be ended. However, for a cycle without an indexS=0, the cycle may be ended after only one iteration for indexS=scanIndex. Accordingly, if the determination at block 136 is "No," then block 136 is followed by block 142 where the VLC tables, updated EOB shifts and updated sEOB shifts are assembled for transmission, as will be described in more detail in relation to FIG. 11.

Block 142 is followed by block 144 where a determination is made whether the last cycle has been reached. If the determination at block 144 is "Yes," then block 144 ends the process 120. However, if the determination at block 144 is "No," meaning more cycles, the current cycle is incremented at block 146. Block 146 returns to block 126 to repeat the process of updating the VLC tables, EOB and sEOB shifts for indexS=0 and scanIndex.

Figure 10:
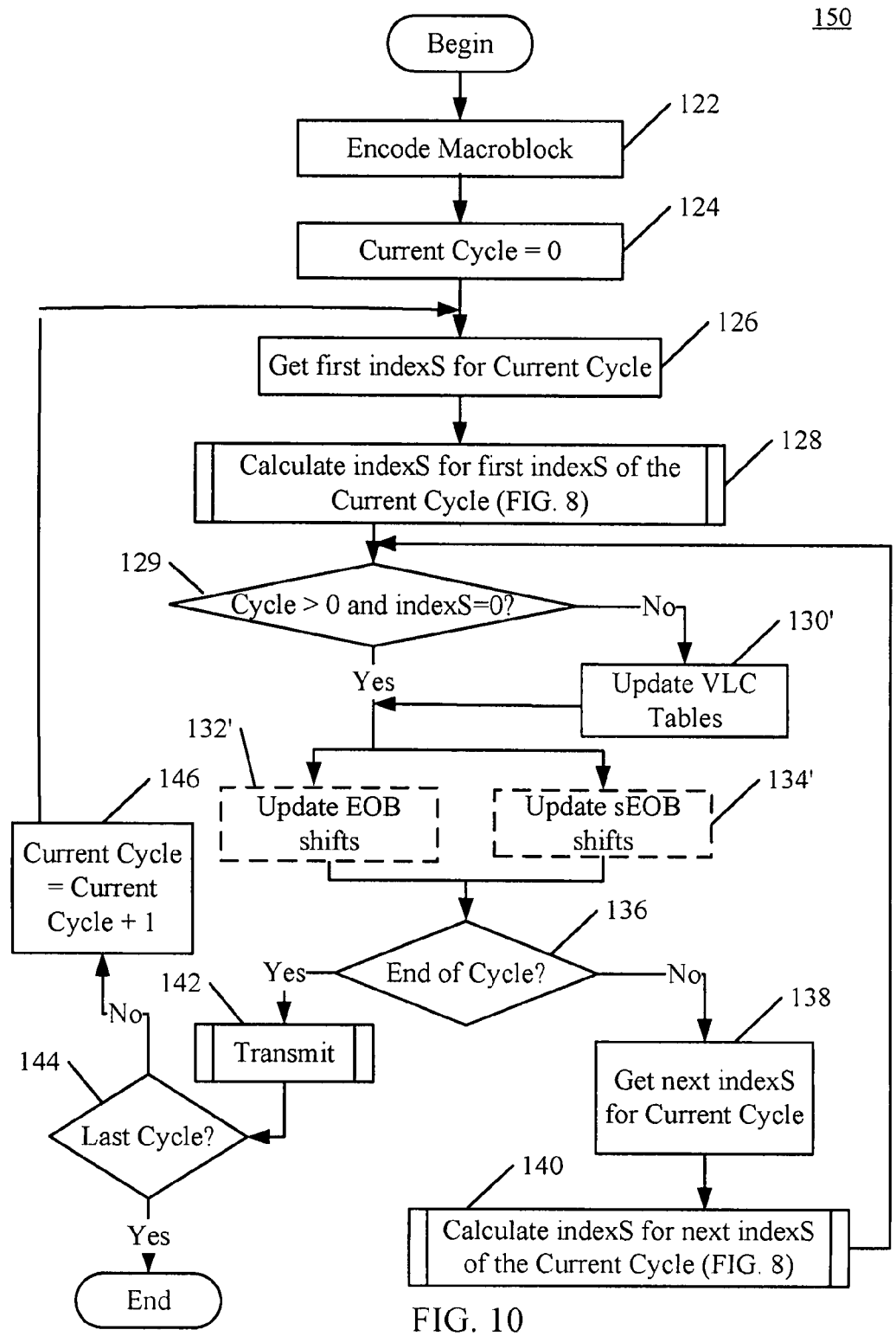
FIG. 10 shows a general flowchart of a SVC simplified encoding process for encoding a macroblock using SVC and the redefined indexS.

FIG. 10 shows a general flowchart of a SVC simplified encoding process 150 for encoding a macroblock using SVC and the redefined indexS. To further simplify the encoding process 120, after Cycle 0, the VLC tables are not adapted for indexS equal to 0 (EOB and sEOB should never be signaled for Cycle 0 or indexS=0 within the constraints of the current SVC syntax). Thus, blocks 132' and 134' are shown in phantom as they may be omitted for cycle 0 or when indexS=0. The VLC table selected for Cycle 0 is used when indexS is equal to 0 for any other Cycle. If paralleled decoding of different Cycles is desired, VLC table index for indexS=0 should be signaled to the decoder.

In FIG. 10, the SVC simplified encoding process 150 is essentially the same as the process 120 in FIG. 9 except that the condition at block 129 is added and the VLC table, EOB and sEOB are updated in a slightly different order. Thus, only the modified or additional blocks will be described. The other blocks of process 150 were previously described above in FIG. 9. In FIG. 10, a determination is made after block 128 to determine if both the current cycle is greater than 0 and indexS is =0. If the determination is "No," then the VLC table is updated at block 130'. The VLC table is not updated or changed for any cycle greater than 0 when indexS is equal to 0. Thus, if the determination at block 129 is "Yes," then only the EOB shifts and sEOB shifts are updated at blocks 132' and 134', respectively. Block 130' is also followed by blocks 132' and 134'. Blocks 132' and 134' are followed by block 136.

In a further alternative configuration, indexS can be always assigned the value of the starting scan position index. In this configuration, for coefficients for which indexS>0, and EOB and sEOB are not allowed, assignment of VLC code indexes for significance runs has to be modified accordingly. For example, when indexS=4, values of r, in the (p,r,v) triplet, reserved for EOB and sEOB are equal to, respectively, 0 and 5, and the following VLC tables are selected in accordance with Table 1.

TABLE 1

| Symbol | Code index | Code Length |
|---|---|---|
| EOB | 0 | 1 |
| significance run 0 | 1 | 3 |
| significance run 1 | 2 | 3 |
| significance run 2 | 3 | 4 |
| significance run 3 | 4 | 4 |
| sEOB | 5 | 5 |
| significance run 4 | 6 | 5 |
| significance run 5 | 7 | 6 |
| significance run 6 | 8 | 6 |
| significance run 7 | 9 | 7 |
| significance run 8 | 10 | 7 |
| significance run 9 | 11 | 8 |
| significance run 10 | 12 | 8 |
| ... | | |

For coefficients for which EOB and sEOB is not allowed assignment of symbols (significance runs) to VLC code indexes will be assigned according to Table 2.

TABLE 2

| Symbol | Code index | Code Length |
|---|---|---|
| significance run 0 | 0 | 1 |
| significance run 1 | 1 | 3 |
| significance run 2 | 2 | 3 |
| significance run 3 | 3 | 4 |
| significance run 4 | 4 | 4 |
| significance run 5 | 5 | 5 |
| significance run 6 | 6 | 5 |
| significance run 7 | 7 | 6 |
| significance run 8 | 8 | 6 |
| significance run 9 | 9 | 7 |
| significance run 10 | 10 | 7 |
| significance run 11 | 11 | 8 |
| significance run 12 | 12 | 8 |
| ... | | |

Figure 11:
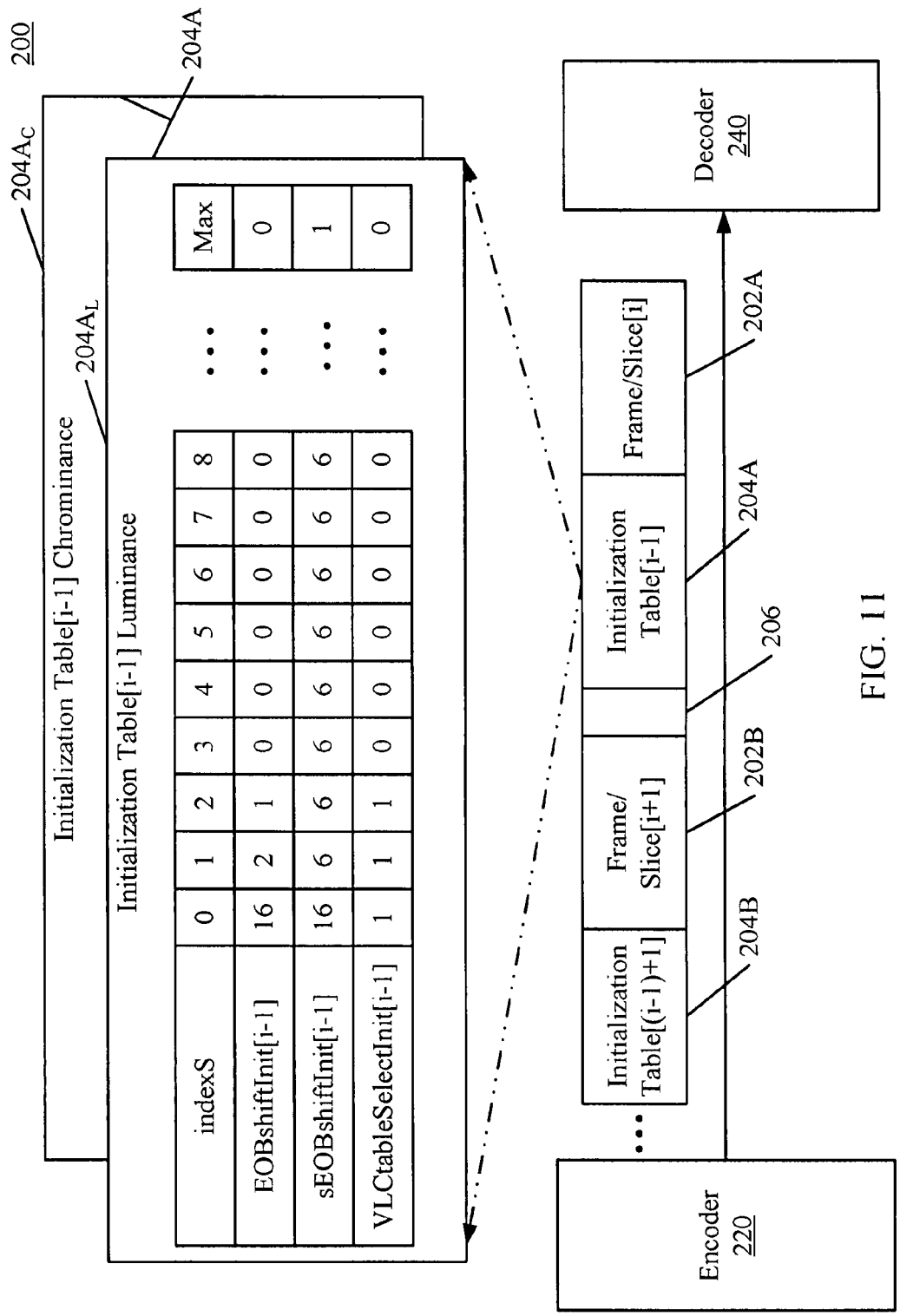
FIG. 11 shows a general block diagram for SVC frame transmission with a first level of bit conservation of an efficient SVC codec.

FIG. 11 shows a general block diagram for SVC frame transmission with a first level of bit conservation of an efficient SVC codec 200. The efficient SVC codec 200 includes an encoder 220 and a decoder 240. To increase coding efficiency of the adaptation described herein, the efficient SVC codec 200 transmits to the decoder 240 initialization table[i−1] 204A for each frame or slice denoted as frame/slice[i]. The initialization tables[i−1] 204 may include one or more syntax elements. For example, the initialization tables[i−1] 204A include at least initialization tables[i−1] 204$A_L$ for luminance and initialization tables[i−1] 204$A_C$ for chrominance. Only the initialization tables[i−1] 204$A_L$ are shown. The initialization tables[i−1] 204$A_L$ include tables EOBshiftInit[i−1], sEOBshiftInit[i−1] and VLCtableSelectInit[i−1] for luminance. The initialization tables[i−1] 204$A_C$ for chrominance may also include tables EOBshiftInit[i−1], sEOBshiftInit[i−1] and VLCtableSelectInit[i−1] for chrominance. These tables could be obtained by the encoder 220 using for example statistic gathered for the previously encoded frame or slice which would ensure that they reflect the statistic of the current frame which is better than the default tables. In this configuration, the indicator i denotes the current frame or slice and i−1 denotes the previous frame or slice. The indicator Max denotes the last indexS.

In FIG. 11, the transmission from the encoder 220 to the decoder 240 would include a bitstream representative of the current frame/slice[i] 202A, followed by the initialization tables[i−1] 204A. Block 206 is shown only to represent that other data in the bitstream may be included, as necessary. The next frame/slice[i+1] 202B would follow block 206 or 204A. Following the next frame/slice[i+1] 202B, the initialization tables[(i−1)+1] 204B would be communicated to the decoder 240. The bitstream includes the pattern with or without block 206 for the remaining frames or slices. In this example, the information is shown in a single bitstream. However, the frame/slice information may be sent in a stream separated from the initialization tables. In this configuration, the decoder 240 would not be required to use default tables for luminance and chrominance or other syntax elements if sent in the initialization tables[i−1] 204A, the initialization tables [(i−1)+1] 204B, etc.

Figure 12:
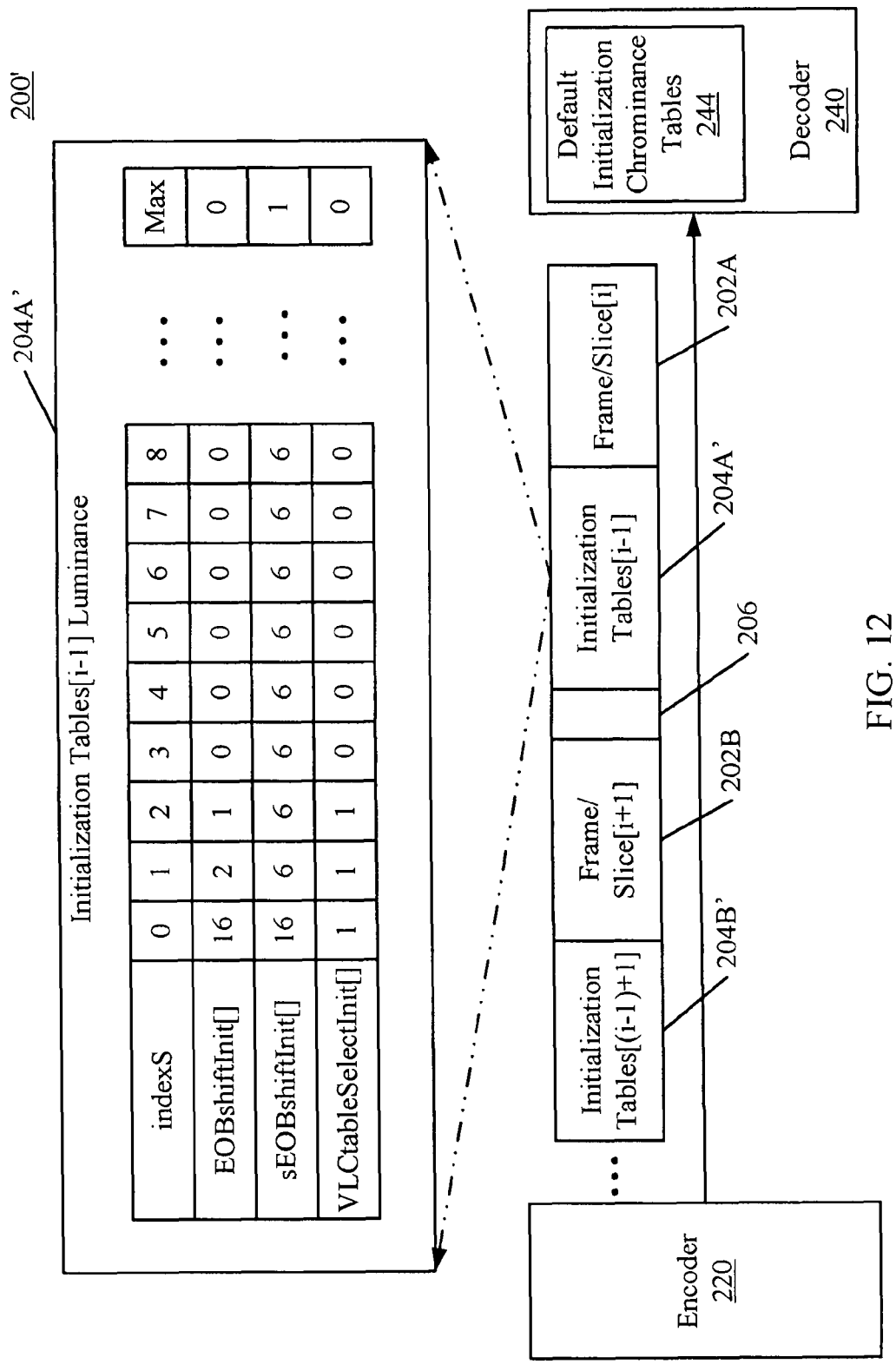
FIG. 12 shows a general block diagram for SVC frame transmission with a second level of bit conservation of an efficient SVC codec.

FIG. 12 shows a general block diagram for SVC frame transmission with a second level of bit conservation of an efficient SVC codec 200'. In the efficient SVC codec 200', the initialization tables[i−1] 204A' include tables EOBshiftInit[i−1], sEOBshiftInit[i−1] and VLCtableSelectInit[i−1] for only luminance. Thus, for some frames/slices 202A' and 202B' the initialization table[i−1] 204A' and the initialization table[(i−1)+1] 204B' for only luminance would be sent. In this configuration, the decoder 240 would use default initialization chrominance tables 244 resident at the decoder 240 for decoding the frame/slice.

Figure 13:
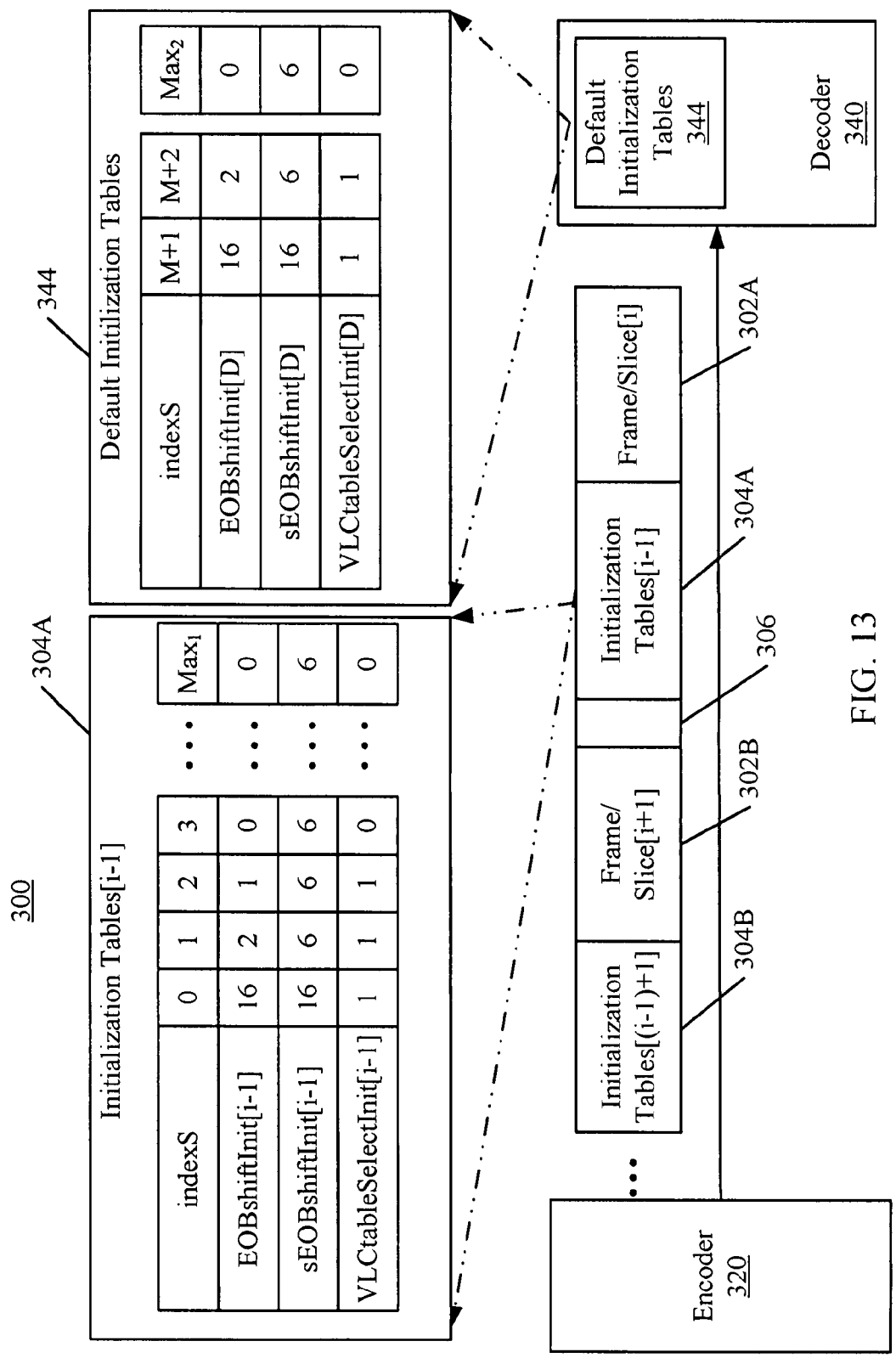
FIG. 13 shows a general block diagram for SVC frame transmission with a third level of bit conservation of an efficient SVC codec

FIG. 13 shows a general block diagram for SVC frame transmission with a third level of bit conservation of an efficient SVC codec 300. The codec 300 includes an encoder 320 and a decoder 340. To reduce the amount of bits needed to transmit the initialization tables[i−1] 304A, the tables for EOBshiftInit[i−1], sEOBshiftInit[i−1] and VLCtableSelectInit[i−1] can be transmitted only for some of the indexS values. For example for indexS<$Max_1$. For example, $Max_1$ may be 8. For the remaining values of indexS, default initialization tables 344 with default values EOBshiftInit[D], sEOBshiftInit[D] and VLCtableSelectInit[D] for indexS>$Max_1$ (M) denoted as M+1, M+2, . . . $Max_2$ are used by the decoder 340. The indexS values for which EOBshiftInit[i−1], sEOBshiftInit[i−1] and VLCtableSelectInit[i−1] are signaled to the decoder 340 and can be determined adaptively in the encoder 320 and vary from frame-to-frame or slice-to-slice.

In FIG. 13, the transmission from the encoder 320 to the decoder 340 would include a bitstream representative of the current frame/slice[i] 302A, followed by the initialization tables[i−1] 304A. Block 306 is shown only to represent that other data in the bitstream may be included. The next frame/slice[i+1] 302B would follow block 306 or 304A. Following the next frame/slide[i+1] 302B, the initialization tables[(i−1)+1] 304B would be communicated to the decoder 340. The bitstream includes the pattern with or without block 306 for the remaining frames or slices. In this configuration, the information is shown in a single bitstream. However, the frame/slice information may be sent in a stream separated from the initialization tables.

Furthermore depending on the frames/slices content initialization tables only for some of the syntax elements can be transmitted and for the remaining ones default initialization tables should be used. For example, for some slices/frames, only initialization tables for EOB and VLC table indexes for luminance can be transmitted, as shown in FIG. 12.

It can be observed that EOB Shift and sEOB values are usually monotonically decreasing when the cycle number or indexS are increasing. Hence, the EOB Shift table may be communicated by allowing the value of the EOB shift for indexS=1 to take one of all possible values (e.g. from 0 to 15). For indexS>1, the EOB Shift value is restricted to be the same or smaller than the EOB Shift value for indexS−1. Thus for indexS>1 only one bit per indexS value is needed to signal EOB Shift value (e.g., 0—EOB Shift value stays the same, 1—EOB Shift value should be decreased by 1). When EOB Shift value reaches 0 for indexS=Max, no additional information needs to be transmitted for indexS larger than Max.

The methods described for transmitting initialization table can be used with or without adaptation. In the latter case the values given in the initialization tables are used for the whole frame/slice.

The techniques described herein above may be used for wireless communications, computing, personal electronics, etc. An exemplary use of the techniques for wireless communication is described below.

Figure 14:
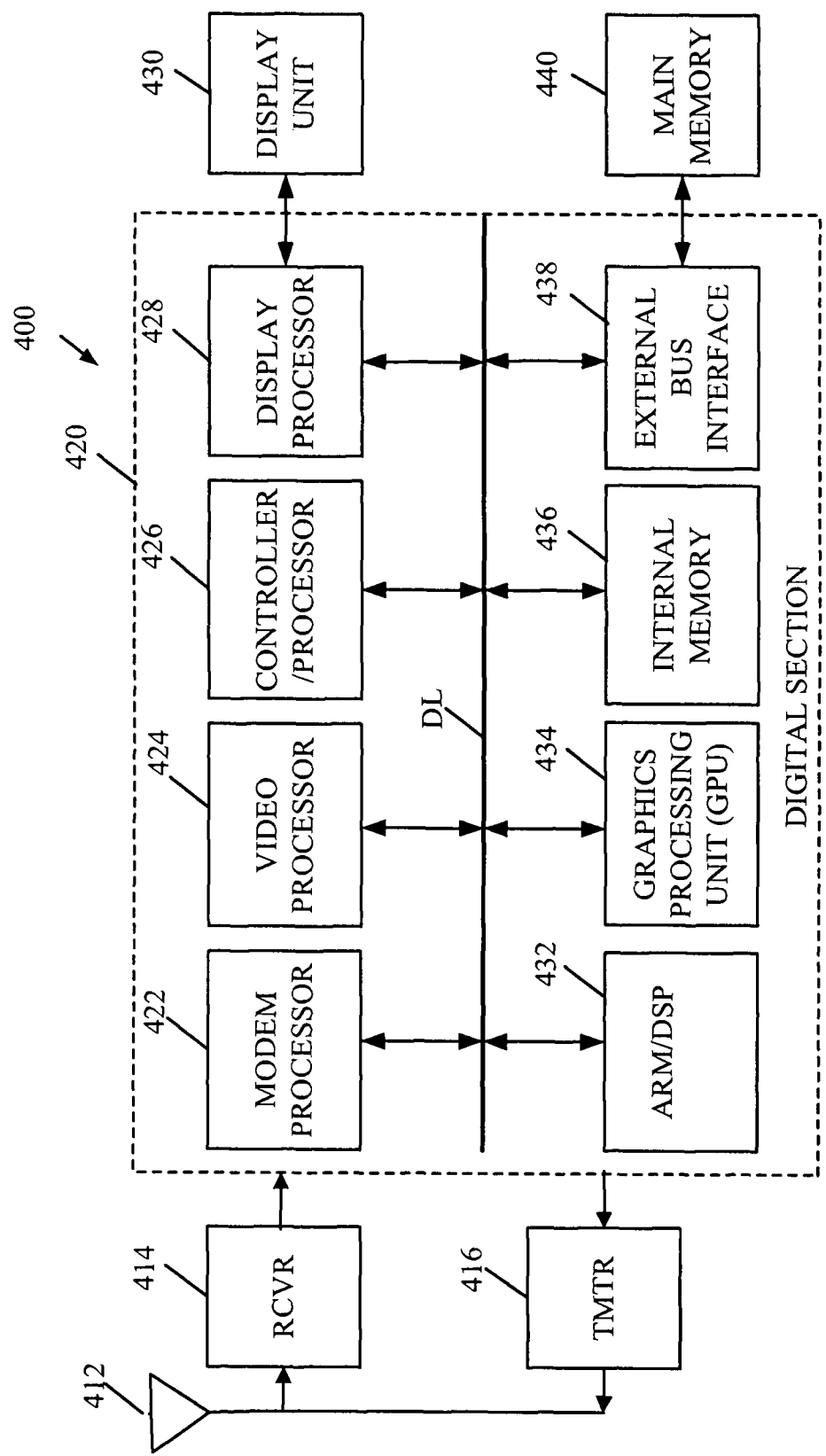
FIG. 14 shows a block diagram of a configuration of a wireless device.

FIG. 14 shows a block diagram of a configuration of a wireless device 400 in a wireless communication system. The wireless device 400 may be a handset. The handset may be a cellular or camera phone, a terminal, a wirelessly-equipped personal digital assistant (PDA), wireless communications device, a video game console, a laptop computer, a video-enabled device or some other wirelessly-equipped device. The wireless communication system may be a Code Division Multiple Access (CDMA) system, a Global System for Mobile Communications (GSM) system, or some other system.

The wireless device 400 is capable of providing bi-directional communications via a receive path and a transmit path. On the receive path, signals transmitted by base stations are received by an antenna 412 and provided to a receiver (RCVR) 414. The receiver 414 conditions and digitizes the received signal and provides samples to a digital section 420 for further processing. On the transmit path, a transmitter (TMTR) 416 receives data to be transmitted from the digital section 420, processes and conditions the data, and generates a modulated signal, which is transmitted via the antenna 412 to the base stations.

The digital section 420 includes various processing, interface and memory units such as, for example, a modem processor 422, a video processor 424, a controller/processor 426, a display processor 428, an ARM/DSP 432, a graphics processing unit (GPU) 434, an internal memory 436, and an external bus interface (EBI) 438. The modem processor 422 performs processing for data transmission and reception (e.g., encoding, modulation, demodulation, and decoding). The video processor 424 performs processing on video content (e.g., still images, moving videos, and moving texts) for video applications such as camcorder, video playback, and video conferencing. The controller/processor 426 may direct the operation of various processing and interface units within digital section 420. The display processor 428 performs processing to facilitate the display of videos, graphics, and texts on a display unit 430. The ARM/DSP 432 may perform various types of processing for the wireless device 400. The graphics processing unit 434 performs graphics processing.

The techniques described herein may be used for any of the processors in the digital section 420, e.g., the video processor 424. The internal memory 436 stores data and/or instructions for various units within the digital section 420. The EBI 438 facilitates the transfer of data between the digital section 420 (e.g., internal memory 436) and a main memory 440 along a bus or data line DL.

The digital section 420 may be implemented with one or more DSPs, micro-processors, RISCs, etc. The digital section 420 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A device comprising:
   a processing circuit configured to execute a first set of instructions operative to generate initialization tables for a current frame or slice, the initialization tables having statistics of a significant coefficient pass for a previous encoded frame or slice using scalable video coding, wherein the statistics in the initialization tables are defined by an index, and wherein the processing circuit is further configured to execute a second set of instructions operative to limit the index to one of 0 and scanIndex, wherein scanIndex defines a starting scan position index of the significant coefficient pass; and
   a transmitter to transmit the initialization tables with the current frame or slice to a decoder.

2. The device of claim 1, wherein the initialization tables includes a variable length coding (VLC) table, an End of Block (EOB) shift table and a special EOB (sEOB) shift table.

3. The device of claim 2, wherein the processing circuit is further configured to execute a third set of instructions where after cycle 0, the VLC table is not updated for the index equal to 0.

4. The device of claim 1, wherein the initialization tables are for luminance only.

5. The device of claim 1, wherein the initialization tables are for luminance and chrominance.

6. The device according to claim 1, wherein the device is a cellular phone, wireless device, handset, wireless communications device, a video game console, a wirelessly-equipped personal digital assistant (PDA), a laptop computer, or a video-enabled device.

7. An integrated circuit comprising:
   a processing circuit configured to execute a first set of instructions operative to generate initialization tables for a current frame or slice, the initialization tables having statistics of a significant coefficient pass for a previous encoded frame or slice using scalable video coding, wherein the statistics in the initialization tables are defined by an index, and wherein the processing circuit is further configured to execute a second set of instructions operative to limit the index to one of 0 and scanIndex, wherein scanIndex defines a starting scan position index of the significant coefficient pass; and
   a transmitter to transmit the initialization tables with the current frame or slice to a decoder.

8. The integrated circuit of claim 7, wherein the initialization tables includes a variable length coding (VLC) table, an End of Block (EOB) shift table and a special EOB (sEOB) shift table.

9. The integrated circuit of claim 8, wherein the processing circuit is further configured to execute a third set of instructions where after cycle 0, the VLC table is not updated for the index equal to 0.

10. The integrated circuit of claim 8, wherein the initialization tables are for luminance, chrominance or both the luminance and the chrominance.

11. A device comprising:
    generating means for generating initialization tables for a current frame or slice, the initialization tables having statistics of a significant coefficient pass for a previous encoded frame or slice using scalable video coding, wherein the statistics in the initialization tables are defined by an index, and wherein the generating means is also configured to limit the index to one of 0 and scanIndex, wherein scanIndex defines a starting scan position index of the significant coefficient pass; and
    transmitting means for transmitting the initialization tables with the current frame or slice to a decoder.

12. The device of claim 11, wherein the initialization tables includes a variable length coding (VLC) table, an End of Block (EOB) shift table and a special EOB (sEOB) shift table.

13. The device of claim 12, wherein the initialization tables are for luminance, chrominance or both the luminance and the chrominance.

14. A computer program product including a non-transitory computer readable medium having instructions for causing a computer to:
    generate initialization tables for a current frame or slice, the initialization tables having statistics of a significant coefficient pass for a previous encoded frame or slice using scalable video coding, wherein the statistics in the initialization tables are defined by an index;
    limit the index to one of 0 and scanIndex, wherein scanIndex defines a starting scan position index of the significant coefficient pass; and
    transmit the initialization tables with the current frame or slice to a decoder.

15. The computer program product of claim 14, wherein the initialization tables includes a variable length coding (VLC) table, an End of Block (EOB) shift table and a special EOB (sEOB) shift table.

16. The computer program product of claim 15, wherein the initialization tables are for luminance, chrominance or both the luminance and the chrominance.

17. A method comprising:
    encoding a current frame or slice using scalable video coding;
    generating initialization tables for the current frame or slice, the initialization tables having statistics of a significant coefficient pass for a previous encoded frame or slice using the scalable video coding, wherein the statistics in the initialization tables are defined by an index;
    limiting the index to one of 0 and scanIndex, wherein scanIndex defines a starting scan position index of the significant coefficient pass; and
    transmitting the initialization tables with the current frame or slice to a decoder.

18. The method of claim 17, wherein the transmitting includes transmitting a variable length coding (VLC) table, an End of Block (EOB) shift table and a special EOB (sEOB) shift table in the initialization tables.

19. The method of claim 18, wherein the transmitting includes transmitting a variable length coding (VLC) table, an End of Block (EOB) shift table and a special EOB (sEOB) shift table in the initialization tables for luminance, chrominance or both luminance and chrominance.

20. The method of claim 17, further comprising:
    decoding by the decoder the current frame or slice using the transmitted initialization tables.

21. The method of claim 20, wherein the decoding includes decoding by the decoder the current frame or slice using default tables residing at the decoder.

* * * * *